United States Patent [19]

Suzuki et al.

[11] Patent Number: 5,475,559
[45] Date of Patent: Dec. 12, 1995

[54] NEGATIVE-SEQUENCE TIME-OVERCURRENT RELAY

[75] Inventors: Kazuhiro Suzuki, Sagamihara; Yoshitaka Sakai, Ushiku; Rikio Sato, Tokyo, all of Japan

[73] Assignee: Kabushiki Kaisha Toshiba, Kawasaki, Japan

[21] Appl. No.: 269,030

[22] Filed: Jun. 30, 1994

[30] Foreign Application Priority Data

Jun. 30, 1993 [JP] Japan .................................. 5-188851

[51] Int. Cl.$^6$ .................................................. H02H 3/093
[52] U.S. Cl. ................................................. 361/76; 361/31
[58] Field of Search ................................. 361/23–24, 28, 361/30–31, 33, 76–78, 86–87

[56] References Cited

U.S. PATENT DOCUMENTS 4,210,948  7/1980  Waltz .

FOREIGN PATENT DOCUMENTS 5-268718  10/1993  Japan .

OTHER PUBLICATIONS

"Instruction For Negative–Sequence Time Overcurrent Relay"; Toshiba; (6E2S0819); pp. 1–10.
Sakai, Y., et al.; 1992 National Convention record of IEEE Japan, No. 1293; Mar., 1992.
Patent Abstracts of Japan, vol. 18, No. 47 (E–1496), Jan. 25, 1994, JP–A–5 268 718, Oct. 15, 1993.

Primary Examiner—A. D. Pellinen
Assistant Examiner—Michael J. Sherry
Attorney, Agent, or Firm—Oblon, Spivak, McClelland, Maier & Neustadt

[57] ABSTRACT

Disclosed is a negative-sequence time-overcurrent relay for use in a polyphase synchronous rotary electric machine having a main-circuit breaker and an exciting circuit. The negative-sequence time-overcurrent relay has a first unit for extracting a fundamental-wave component and a harmonic component from a predetermined electric parameter for each phase given to the polyphase synchronous rotary electric machine, a second unit for extracting a fundamental-wave negative sequence current for each phase from a fundamental wave, a first calculating unit for squaring the fundamental-wave negative sequence current for each phase, a second calculating unit for squaring the harmonic component for each phase, a first adding unit for adding phase-by-phase operational outputs from the second calculating unit, a multiplying unit for multiplying an output from the first adding unit by a predetermined constant, a second adding unit for adding a phase-by-phase output from the first second calculating unit to an output from the multiplying unit, and a determining unit for determining that the polyphase synchronous rotary electric machine is protected when a sum of added values for individual phases obtained from the second adding unit exceeds a predetermined value.

13 Claims, 11 Drawing Sheets

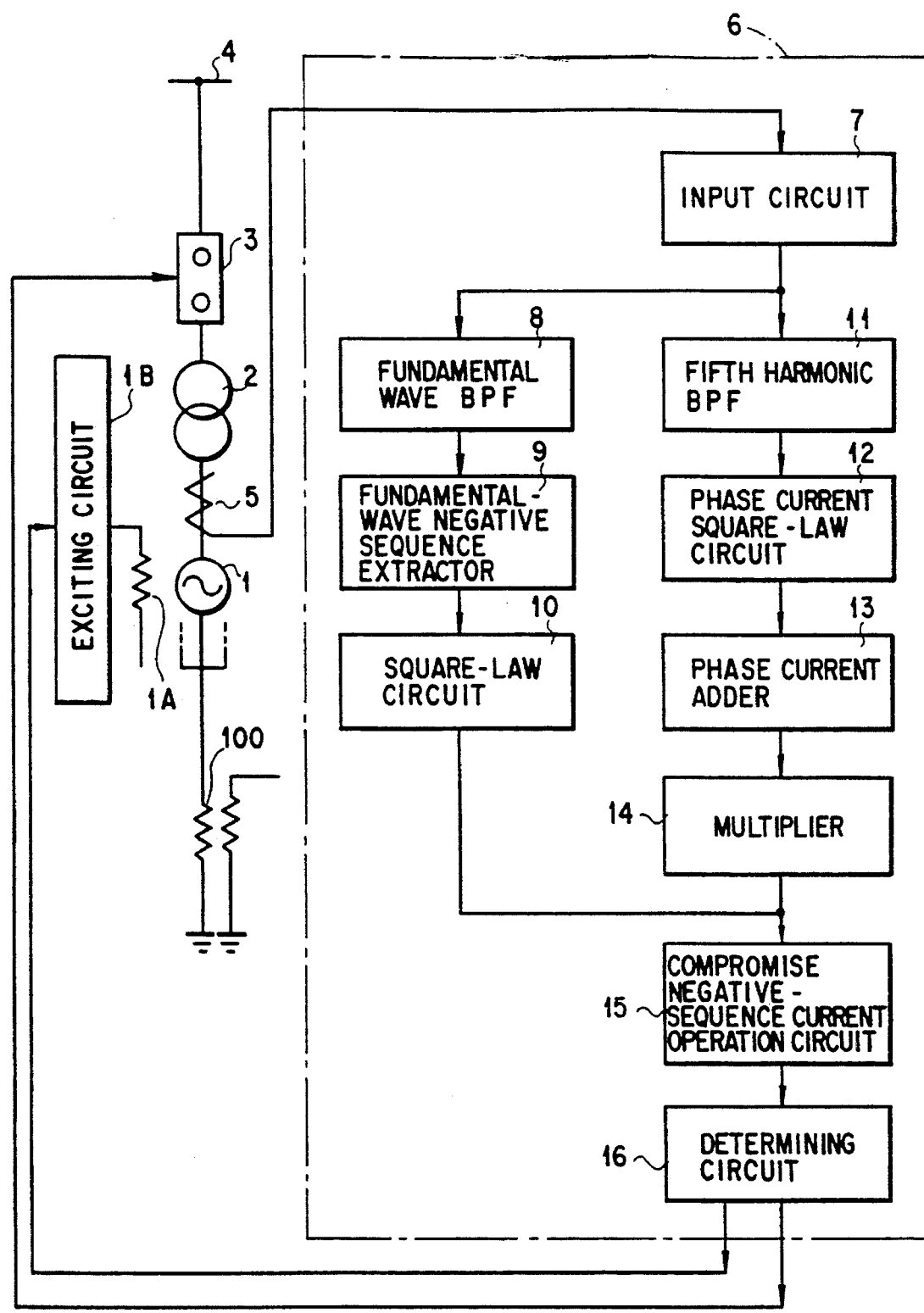
F I G. 1

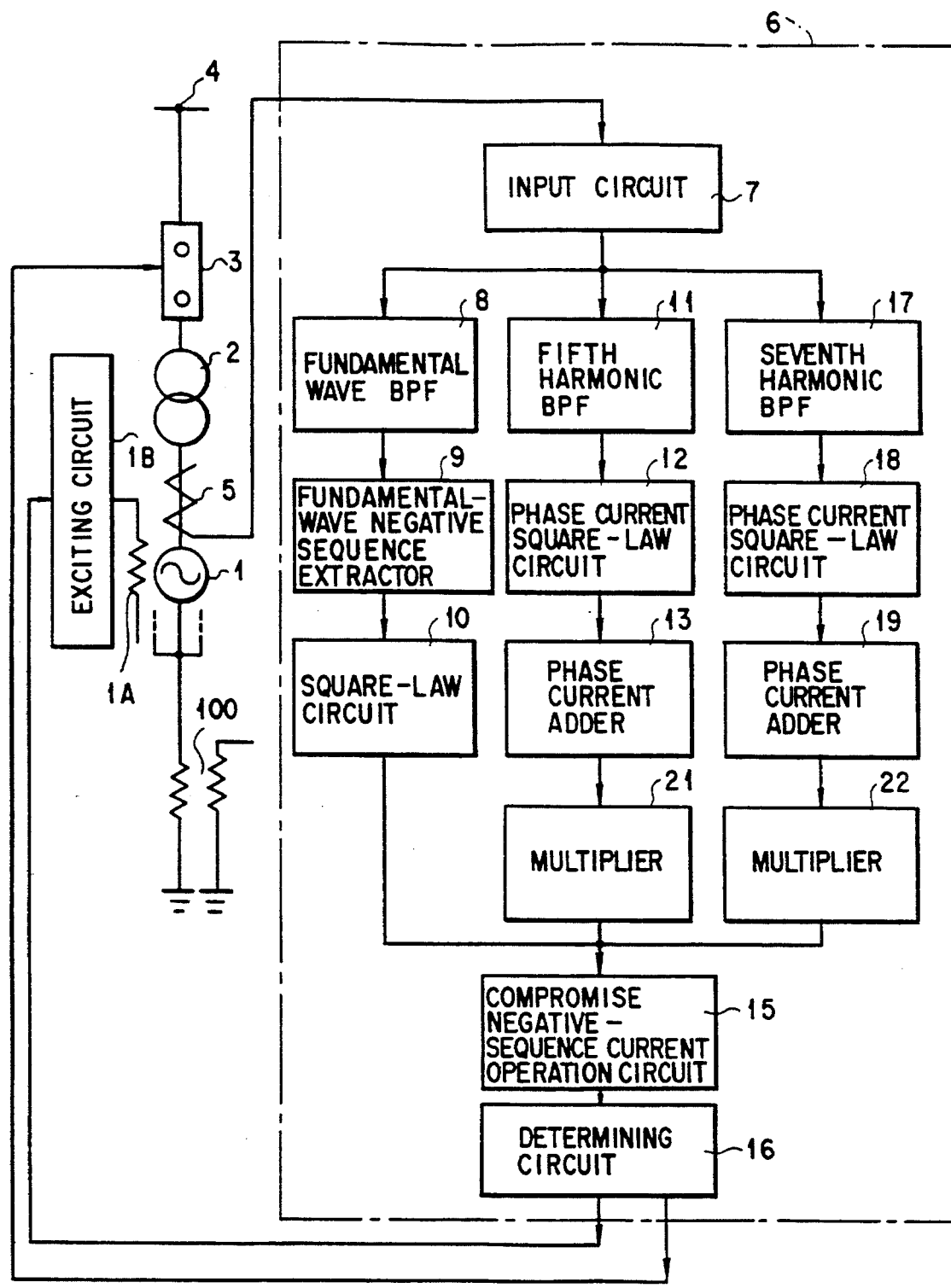
F I G. 3

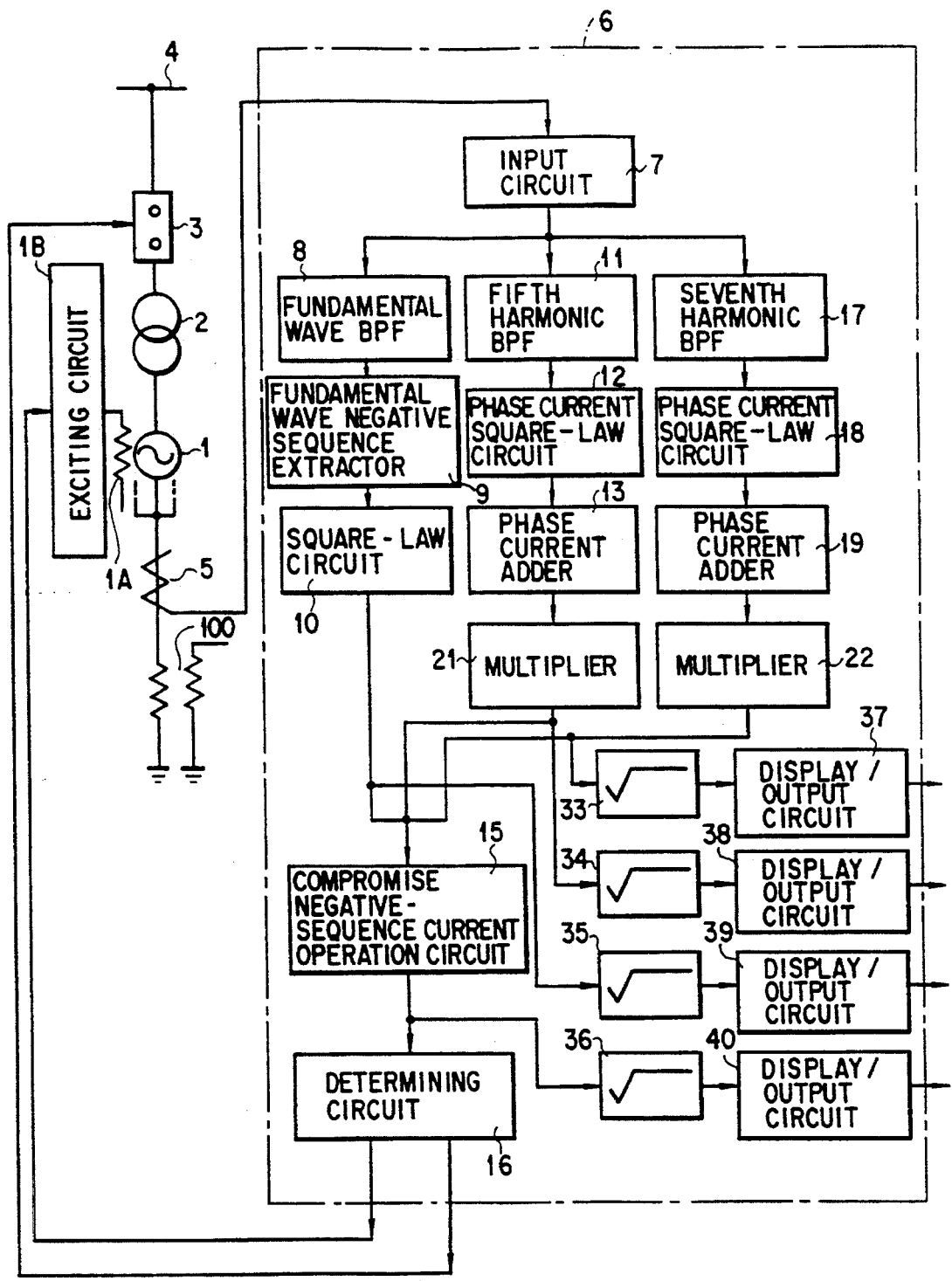
F I G. 6

NEGATIVE-SEQUENCE TIME-OVERCURRENT RELAY

BACKGROUND OF THE INVENTION

1. Field of the Invention

The present invention relates to a negative-sequence time-overcurrent relay which is adapted for use in a polyphase synchronous rotary electric machine, such as a polyphase synchronous motor, polyphase synchronous generator and polyphase synchronous condenser, and protects the polyphase synchronous rotary electric machine.

2. Description of the Related Art

With regard to a synchronous rotary electric machine, the withstanding of negative sequence current is defined as follows. When a negative sequence current flows across the armature winding, a rotating field is generated on the rotator, causing an induced current to flow on the surface of the rotator. The surface temperature of the rotator therefore rises. To restrict the rising of the surface temperature of the rotator, the negative sequence current should be restricted.

There are two ways of restricting the negative sequence current: short withstanding for restricting a relatively large negative sequence current in a short-time area where the effect of the heat discharged from the rotator is negligible and continuous withstanding for restricting a relatively small negative sequence current for a long period of time or in a continuous-time area where the effect of the heat discharged from the rotator appears.

When a harmonic current flows across the armature winding of a synchronous rotary electric machine, a rotating field having a frequency several times greater than that of the harmonic current is generated in the rotator. Consequently, an induced current flows on the surface of the rotator, causing the surface temperature of the rotator to rise. Like the restriction of the negative sequence current, the harmonic current is also restricted.

Therefore, the characteristics of a synchronous rotary electric machine are restricted by a total negative sequence current ($I_2$), which is the total influence of the negative sequence current of the fundamental wave and the harmonic current.

When the fundamental-wave negative sequence current ($I_{2 \cdot 1f}$) and an arbitrary harmonic current ($I_{nf}$: n being the order number of the harmonic) flow in a synchronous rotary electric machine, the amount of their influence, if expressed as the total negative sequence current $I_2$, is defined by the following equation (1). Here the total negative sequence current $I_2$ is the amount of the influence of the fundamental-wave negative sequence current and an arbitrary harmonic current on the synchronous rotary electric machine, expressed by the fundamental-wave negative sequence current which imparts the same amount of influence on the synchronous rotary electric machine.

$$I_2 = \sqrt{(I_{2 \cdot 1f})^2 + \sum_{n=2}^{\infty} \left\{ \sqrt{\frac{n-1}{2}} \cdot (I_{1 \cdot nf})^2 + \sqrt{\frac{n+1}{2}} \cdot (I_{2 \cdot nf})^2 \right\}} \quad (1)$$

where n is the order number of the harmonic, $I_{1 \cdot nf}$ is the positive sequence current of the n-th harmonic, and $I_{2 \cdot nf}$ is the negative sequence current of the n-th harmonic.

In the definition equation (1), the zero-phase component of the harmonic current is harmonic current is omitted because it hardly flows due to the center tap of the synchronous rotary electric machine being connected to a high resistor.

The following is one example of the total negative sequence current $I_2$ when the fundamental-wave negative sequence current and the fifth and seventh harmonics are flowing.

$$I_2 = \sqrt{(I_{2 \cdot 1f})^2 + \{\sqrt{2} \ (I_{1 \cdot 5f})^2 + \sqrt{3} \ (I_{2 \cdot 5f})^2\} + \{\sqrt{3} \ (I_{1 \cdot 7f})^2 + \sqrt{4} \ (I_{2 \cdot 7f})^2\}} \quad (2)$$

In computing the total negative sequence current when the fundamental-wave negative sequence current and harmonic current flow in the synchronous rotary electric machine as expressed in the definition equation (1), after the harmonic current is detected, the harmonic current is separated into a positive-sequence component and a negative-sequence component, which are then computed to be equivalent negative sequences.

Therefore, high-precision phase control and level control are needed, and the control circuit has many components, complicating the structure, and requires many control elements.

It is therefore an object of the present invention to provide a negative-sequence time-overcurrent relay which protects a synchronous rotary electric machine without separating a harmonic current negative sequence into a positive sequence and a negative sequence, requiring special phase and level controls and many control elements, and reducing the difference between the harmonic current and a total negative sequence current.

SUMMARY OF THE INVENTION

The above object is achieved by the following negative-sequence time-overcurrent relay. This negative-sequence time-overcurrent relay is adapted for use in a polyphase synchronous rotary electric machine having a main-circuit breaker and an exciting circuit. The negative-sequence time-overcurrent relay comprises:

first extracting means for extracting a fundamental-wave component and a harmonic component from a predetermined electric parameter for each phase given to the polyphase synchronous rotary electric machine;

second extracting means for extracting a fundamental-wave negative sequence current for each phase from a fundamental wave for each phase extracted from the first extracting means;

first calculating means for squaring the fundamental-wave negative sequence current for each phase, extracted by the second extracting means, for each phase;

second calculating means for squaring the harmonic component for each phase, extracted by the first extracting means, for each phase;

first adding means for adding phase-by-phase operational outputs from the second calculating means;

multiplying means for multiplying an output from the first adding means by a predetermined constant;

second adding means for adding a phase-by-phase output from the first calculating means to an output from the multiplying means; and determining means for determining that the polyphase synchronous rotary electric machine should be protected when a sum of added values for individual phases obtained from the second adding means exceeds a predetermined value.

The negative-sequence time-overcurrent relay with the above structure can compute a compromise total negative sequence current without separating the harmonic current into a positive-sequence component and a negative-sequence component by computation and based only on the levels of the individual phases of a harmonic current. Therefore, it is possible to protect a synchronous rotary electric machine without requiring phase control on a harmonic input for computing its positive-sequence and negative-sequence components, control on converted positive and negative sequence currents, a circuit for converting the positive and negative sequence currents to equivalent negative sequence currents and a circuit for adjusting the phases and levels of the positive and negative sequence currents.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a circuit diagram showing a negative-sequence time-overcurrent relay according to a first embodiment of the present invention as adapted to protect against the negative-sequence time-overcurrent of a motor;

FIG. 3 is a circuit diagram showing a negative-sequence time-overcurrent relay according to a third embodiment of this invention;

FIG. 6 is a circuit diagram showing a negative-sequence time-overcurrent relay according to a sixth embodiment of this invention;

DETAILED DESCRIPTION OF THE PREFERRED EMBODIMENTS

Figure 2:
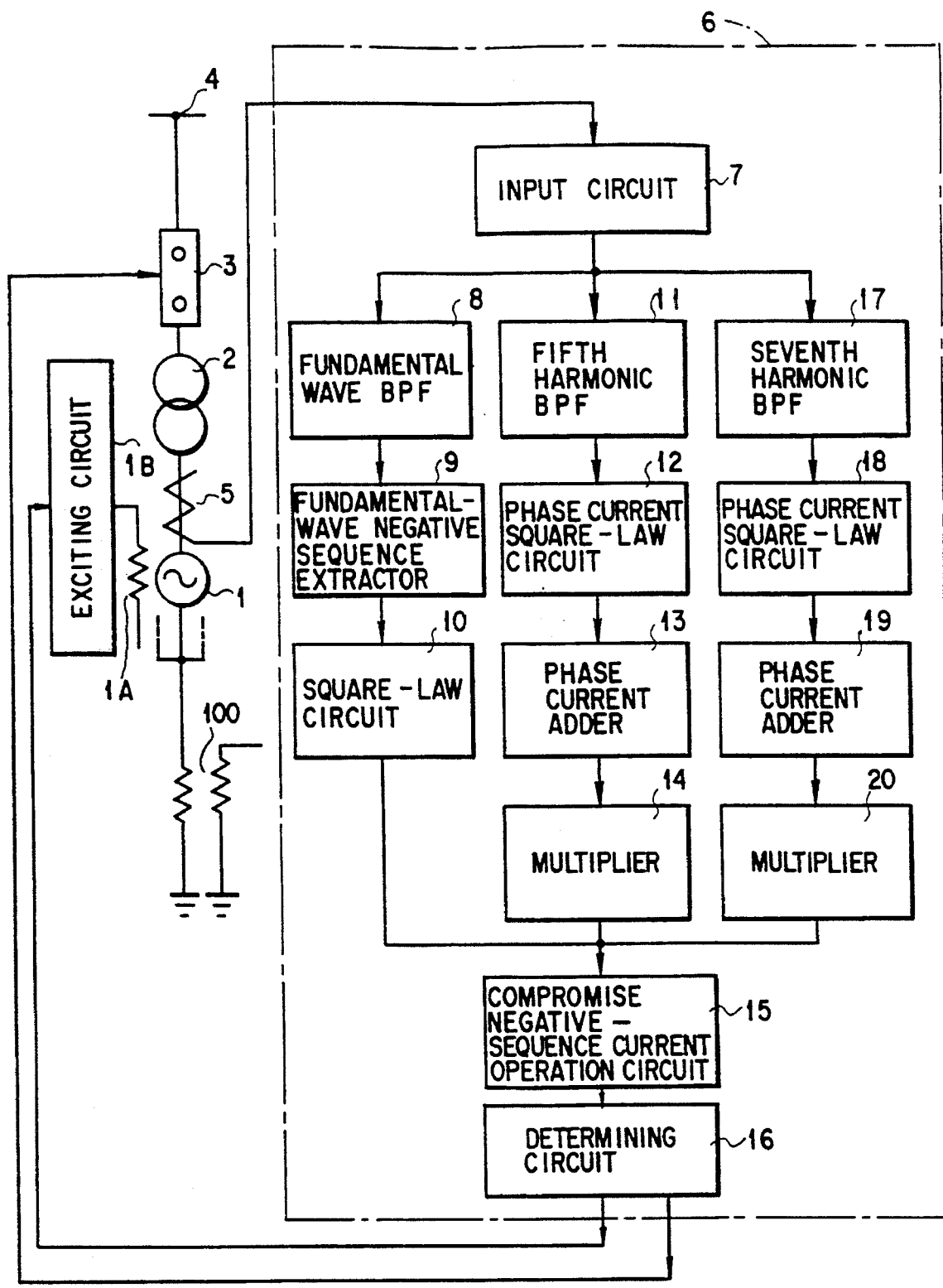
FIG. 2 is a circuit diagram showing a negative-sequence time-overcurrent relay according to a second embodiment of this invention.

Preferred embodiments of the present invention will be described below with reference to the accompanying drawings.

FIG. 1 is a circuit diagram showing a negative-sequence time-overcurrent relay according to a first embodiment of the present invention as adapted for use in a synchronous rotary electric machine. In FIG. 1, a polyphase synchronous rotary electric machine 1 having a field winding 1A and an exciting circuit 1B is connected via a main transformer 2 and a main circuit breaker 3 to a power-transmission line 4. The output of a current transformer 5, which detects a motor current, one of the electric parameters of the polyphase synchronous rotary electric machine 1, is input to a negative-sequence time-overcurrent relay 6. Reference numeral "100" denotes a neutral grounding transformer.

This negative-sequence time-overcurrent relay 6 comprises an input circuit 7, a fundamental wave band-pass filter (BPF) 8 and a fundamental-wave negative sequence extractor 9, a square-law circuit 10, a fifth-harmonic BPF 11, a phase current square-law circuit 12, a phase current adder 13, a multiplier 14, a compromise total negative-sequence current calculator 16 and a determining circuit 16.

The input circuit 7 receives the motor current detected by the transformer 5. The fundamental wave BPF 8 filters the motor current given from the input circuit 7 to obtain a fundamental-wave current component. The fundamental-wave negative sequence extractor 9 extracts 10 a fundamental-wave negative sequence current from the fundamental-wave current component extracted by the fundamental wave BPF 8. The square-law circuit 10 obtains the square of the fundamental-wave current component extracted by the fundamental-wave negative sequence extractor 9. The fifth-harmonic BPF 11 filters the motor current given from the input circuit 7 to yield only a fifth-harmonic component. The phase current square-law circuit 12 obtains the square of each phase current of the fifth-harmonic component extracted by the fifth-harmonic BPF 11. The phase current adder 13 adds the individual phase currents squared by the phase current square-law circuit 12. The multiplier 14 multiplies the sum of the individual squared phase currents, obtained by the phase current adder 13, by a constant ($(2^{1/2}+3^{1/3})/2$ in this example). The compromise total negative-sequence current calculator 15 adds the current component, squared by the square-law circuit 10, to the sum of the individual squared phase currents, multiplied by the constant by the multiplier 14. The determining circuit 16 determines if the operational output of the compromise total negative-sequence current calculator 15 is equal to or greater than a predetermined value, and generates an alarm and outputs a trip signal when that operational output is equal to or greater than the predetermined value.

The operation of the thus constituted negative-sequence time-overcurrent relay according to the first embodiment will be described below. When the motor current detected by the current transformer 5 is input to the input circuit 7, only a fundamental-wave current component is extracted from the input current by the fundamental wave BPF. Then, a fundamental-wave negative sequence current is extracted by the fundamental-wave negative sequence extractor 9 and is then squared by the square-law circuit 10.

With regard to the fifth-harmonic, after only a fifth-harmonic component is extracted by the fifth harmonic BPF 11, individual phase currents squared by the phase current square-law circuit 12 are added by the phase current adder 13 and the resultant value is then multiplied by the constant by the multiplier 14.

When the current component squared by the square-law circuit 10 and the sum of the individual phase currents, multiplied by $(2^{1/2}+3^{1/2})/2$ by the multiplier 14, are input to the compromise total negative-sequence current calculator 15, this calculator 15 adds those values to obtain a total negative sequence current and sends it to the determining circuit 16. The determining circuit 16 determines if the operational output of the compromise total negative-sequence current calculator 15 is equal to or greater than the predetermined value, and generates an alarm and a trip signal when that operational output is equal to or greater than the predetermined value.

Since the determining circuit 16 makes the decision on the total negative sequence current in a squared form, it is unnecessary to obtain a square root of the total negative sequence current.

The following discusses the difference between a compromise definition equation and the definition equation employed in the prior art.

With the positive sequence current and negative sequence current of the n-th harmonic given as follows, the individual phase currents will be expressed by the following equations.

$I_{1 \cdot 5f}$: fifth-harmonic positive sequence current
$I_{2 \cdot 5f}$: fifth-harmonic negative sequence current
$\theta_{5f}$: phase angle of the negative sequence current for the fifth-harmonic positive sequence current
$I_{5f \cdot R}$: fifth-harmonic R phase current
$I_{5f \cdot S}$: fifth-harmonic S phase current
$I_{5f \cdot T}$: fifth-harmonic T phase current
For the R phase current (level), $$I_{5f \cdot R} = |I_{1 \cdot 5f} \angle 0° + I_{2 \cdot 5f} \angle \theta_{5f}| \quad (3)$$
$$= |I_{1 \cdot 5f}(\cos 0° + j \cdot \sin 0°) + I_{2 \cdot 5f}(\cos\theta_{5f} + j\sin\theta_{5f})|$$
$$= |(I_{1 \cdot 5f} + I_{2 \cdot 5f} \cdot \cos\theta_{5f}) + j(I_{2 \cdot 5f} \cdot \sin\theta_{5f})|$$
$$= \sqrt{(I_{1 \cdot 5f} + I_{2 \cdot 5f} \cdot \cos\theta_{5f})^2 + (I_{2 \cdot 5f} \cdot \sin\theta_{5f})^2}$$
$$= \sqrt{(I_{1 \cdot 5f})^2 + 2 \cdot I_{1 \cdot 5f} \cdot I_{2 \cdot 5f} \cdot \cos\theta_{5f} + I_{2 \cdot 5f}^2(\cos^2\theta_{5f} + \sin^2\theta_{5f})}$$
$$= \sqrt{(I_{1 \cdot 5f})^2 + (I_{2 \cdot 5f})^2 + 2 \cdot I_{1 \cdot 5f} \cdot I_{2 \cdot 5f} \cdot \cos\theta_{5f}}$$

Likewise, for the S phase current (level), $$I_{5f \cdot S} = |I_{1 \cdot 5f} \angle 240° + I_{2 \cdot 5f} \angle(\theta_{5f} + 120°)| \quad (4)$$
$$= \sqrt{(I_{1 \cdot 5f})^2 + (I_{2 \cdot 5f})^2 + 2 \cdot I_{1 \cdot 5f} \cdot I_{2 \cdot 5f} \cdot \cos(\theta_{5f} - 120°)}$$

For the T phase current (level), $$I_{5f \cdot T} = |I_{1 \cdot 5f} \angle 120° + I_{2 \cdot 5f} \angle(\theta_{5f} + 240°)| \quad (5)$$
$$= \sqrt{(I_{1 \cdot 5f})^2 + (I_{2 \cdot 5f})^2 + 2 \cdot I_{1 \cdot 5f} \cdot I_{2 \cdot 5f} \cdot \cos(\theta_{5f} + 240°)}$$

Squaring the individual phase currents given by the above equations (3) to (5) and then averaging the resultant values yields $$\frac{I_{5f \cdot R}^2 + I_{5f \cdot S}^2 + I_{5f \cdot T}^2}{3} = ((4)^2 + (5)^2 + (6)^2) \div 3 \quad (6)$$

-continued
$$= \{(I_{1 \cdot 5f})^2 + (I_{2 \cdot 5f})^2 +$$
$$2 \cdot I_{1 \cdot 5f} \cdot I_{2 \cdot 5f} \cdot \cos\theta_{5f} +$$
$$(I_{1 \cdot 5f})^2 + (I_{2 \cdot 5f})^2 + 2 \cdot I_{1 \cdot 5f} \cdot$$
$$I_{2 \cdot 5f} \cdot \cos(\theta_{5f} - 120°) +$$
$$(I_{1 \cdot 5f})^2 + (I_{2 \cdot 5f})^2 + 2 \cdot I_{1 \cdot 5f} \cdot$$
$$I_{2 \cdot 5f} \cdot \cos(\theta_{5f} + 120°)\} \div 3$$
$$= (I_{1 \cdot 5f})^2 + (I_{2 \cdot 5f})^2$$

It is apparent from the equation (6) that the average value of the squared harmonic currents of the individual phases becomes equal to the sum of the squared positive sequence component of the harmonic current and the squared negative sequence component thereof. After an average of equivalent negative sequence current coefficients, $2^{1/2}$ (for the positive sequence) and $3^{1/2}$ (for the negative sequence), of the positive sequence and negative sequence components of the fifth harmonic is obtained and is multiplied by the equation (6), the resultant value is added to the square of the fundamental-wave negative sequence current. Obtaining the square root of the sum is given by the following compromise definition equation.

Compromise definition equation $$I_2 = \sqrt{(I_{2 \cdot 1f})^2 + \frac{\sqrt{2} + \sqrt{3}}{2} \cdot \frac{I_{5f \cdot R}^2 + I_{5f \cdot S}^2 + I_{5f \cdot T}^2}{3}} \quad (7)$$
$$= \sqrt{(I_{2 \cdot 1f})^2 + \frac{\sqrt{2} + \sqrt{3}}{2} \{(I_{1 \cdot 5f})^2 + (I_{2 \cdot 5f})^2\}}$$
$$= \sqrt{(I_{2 \cdot 1f})^2 + \frac{\sqrt{2} + \sqrt{3}}{2} \cdot (I_{1 \cdot 5f})^2 + \frac{\sqrt{2} + \sqrt{3}}{2} \cdot (I_{2 \cdot 5f})^2}$$

The following is a definition equation.
Definition equation $$I_2 = \sqrt{(I_{2 \cdot 1f})^2 + \sqrt{2} \ (I_{1 \cdot 5f})^2 + \sqrt{3} \ (I_{2 \cdot 5f})^2} \quad (8)$$

From the above equations (7) and (8), the coefficients, $I_{1 \cdot 5f}$ and $I_{2 \cdot 5f}$, in the compromise definition equation (7) are respectively 1.11 times ($I_{1 \cdot 5f}$) and 0.91 times ($I_{2 \cdot 5f}$) those in the definition equation (8).

From the above, by computing the compromise total negative sequence current $I_2'$ from the compromise definition equation, the difference between the compromise definition equation and the definition equation can be reduced without separating the harmonic current into positive and negative sequence components and without requiring special phase and level controls and complicated control elements. A negative-sequence time-overcurrent relay according to a second embodiment of the present invention will now be described with reference to FIG. 2. The same reference numerals as used in FIG. 1 are also used in FIG. 2 for corresponding or identical elements to avoid repeating their descriptions, and only the difference between the first and second embodiments will be discussed below.

According to the second embodiment, a seventh harmonic BPF 17, a phase current square-law circuit 18, a phase current adder 19 and a multiplier 20 for multiplying the sum of the individual phase currents by $(3^{1/2}+4^{1/2})/2$ are provided for the seventh harmonic in addition to those of the fifth harmonic, and the compromise total negative-sequence current calculator 15 adds the current component squared by the square-law circuit 10, the sum of the individual phase currents of the fifth harmonic, multiplied by a constant by the multiplier 14, and the sum of the individual phase currents of the seventh harmonic, multiplied by a constant by the multiplier 20 together, as shown in FIG. 2.

A negative-sequence time-overcurrent relay according to a third embodiment of the present invention will now be described with reference to FIG. 3. The same reference numerals as used in FIG. 2 are also used in FIG. 3 for corresponding or identical elements to avoid repeating their descriptions, and only the difference between the second and third embodiments will be discussed below.

According to the third embodiment, the multipliers 4 and 20 shown in FIG. 2 are replaced with a fifth-harmonic coefficient ($k_5$) multiplier 21 and a seventh-harmonic coefficient ($k_7$) multiplier 22 which can select their coefficients as desired.

A negative-sequence time-overcurrent relay according to a fourth embodiment of the present invention will now be described with reference to FIG. 4. The same reference numerals as used in FIG. 2 are also used in FIG. 4 for corresponding or identical elements to avoid repeating their descriptions, and only the difference between the second and fourth embodiments will be discussed below.

Figure 4:
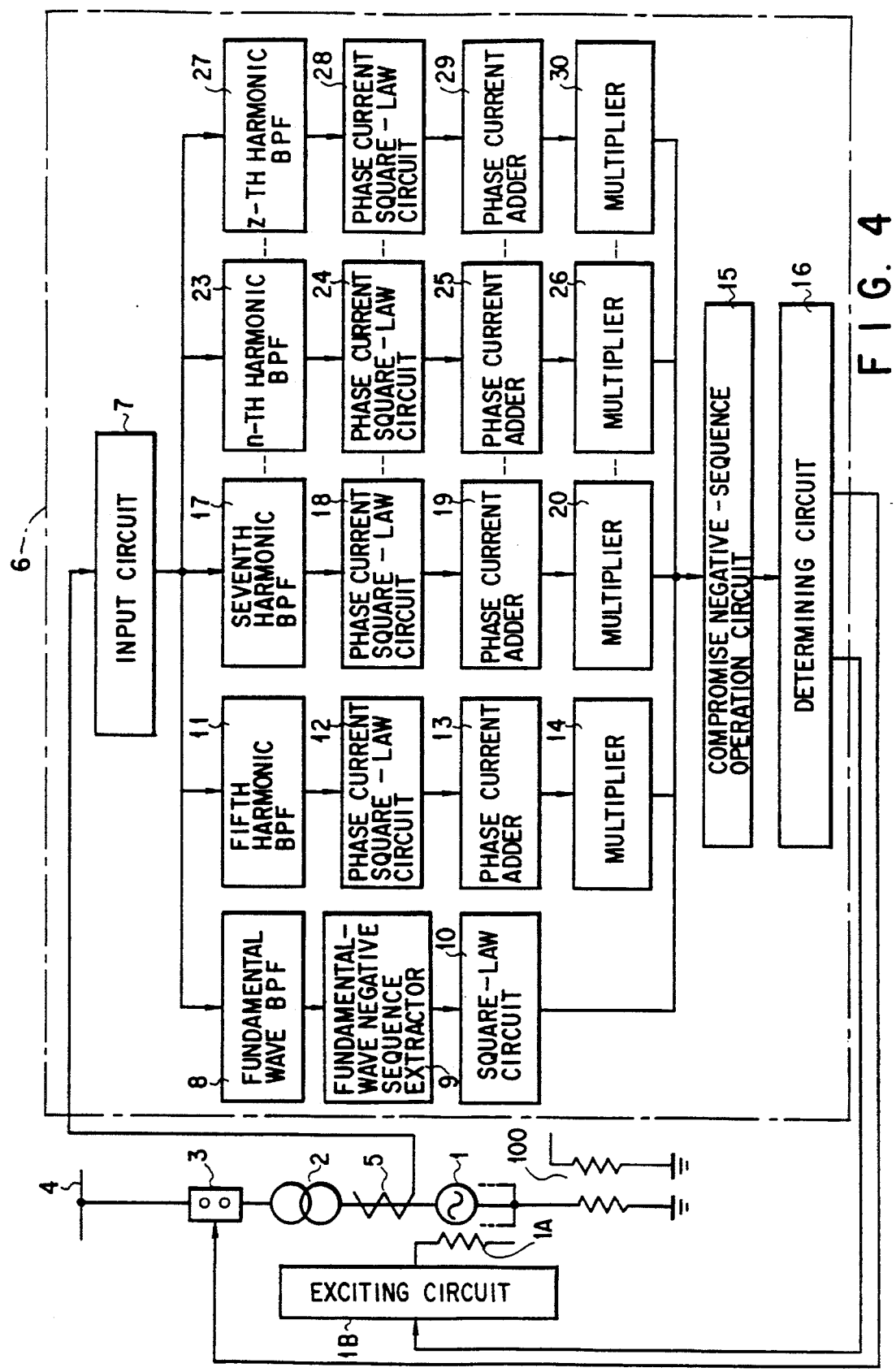
FIG. 4 is a circuit diagram showing a negative-sequence time-overcurrent relay according to a fourth embodiment of this invention.

According to the second embodiment, a n-th harmonic BPF 23, a phase current square-law circuit 24, a phase current adder 25 and a multiplier 26 for multiplying the sum of the individual phase currents of the n-th harmonic by $[\{(n-1)/\}2^{1/2}+\{(n+1)/2^{1/2}\})]/2$ are provided for the n-th harmonic, and a z-th harmonic BPF 27, a phase current square-law circuit 28, a phase current adder 29 and a multiplier 30 for multiplying the sum of the individual phase currents of the z-th harmonic by $[\{(z-1)/\}2^{1/2}\})]/2$ are provided for the z-th harmonic, in addition to those of the fifth harmonic and seventh harmonic, as shown in FIG. 4.

Figure 5:
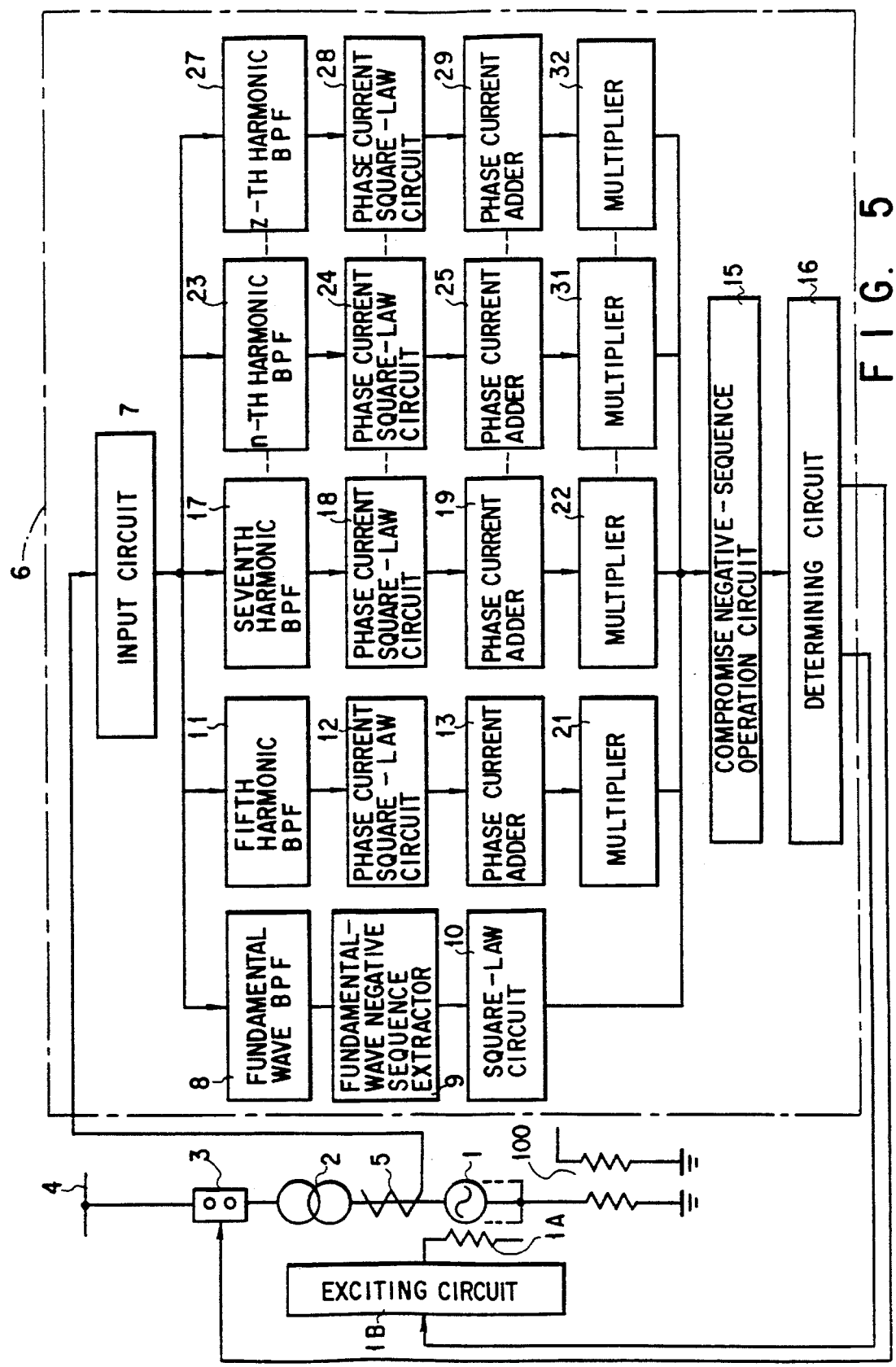
FIG. 5 is a circuit diagram showing a negative-sequence time-overcurrent relay according to a fifth embodiment of this invention.

A negative-sequence time-overcurrent relay according to a fifth embodiment of the present invention will now be described with reference to FIG. 5. The same reference numerals as used in FIG. 3 are also used in FIG. 5 for corresponding or identical elements to avoid repeating their descriptions, and only the difference between the third and fifth embodiments will be discussed below.

According to the fifth embodiment, the multipliers 14, 20, 26 and 30 shown in FIG. 4 are replaced with a 10 fifth-harmonic coefficient ($k_5$) multiplier 21, a seventh-harmonic coefficient ($k_7$) multiplier 22, a n-th harmonic coefficient ($k_n$) multiplier 31, and a z-th harmonic coefficient ($k_z$) multiplier 32, which can select their coefficients as desired.

A negative-sequence time-overcurrent relay according to a sixth embodiment of the present invention will now be described with reference to FIG. 6. The same reference numerals as used in FIG. 3 are also used in FIG. 6 for corresponding or identical elements to avoid repeating their descriptions, and only the difference between the third and sixth embodiments will be discussed below.

According to the sixth embodiment, the fundamental-wave negative sequence current, the compromise equivalent negative sequence currents of the fifth harmonic and seventh harmonic, and the compromise total negative sequence current in the third embodiment shown in FIG. 3 are displayed on display/output circuits 37 to 40 via square-root calculating means 33 to 36, respectively.

This display and output system can also be accomplished by the other embodiments.

Although the foregoing descriptions of the individual embodiments have been given with reference to the case where a motor is protected against the negative-sequence time-overcurrent, this invention can also be applied to a synchronous rotary electric machine different from a motor by inputting the armature current to the input circuit.

Figure 7:
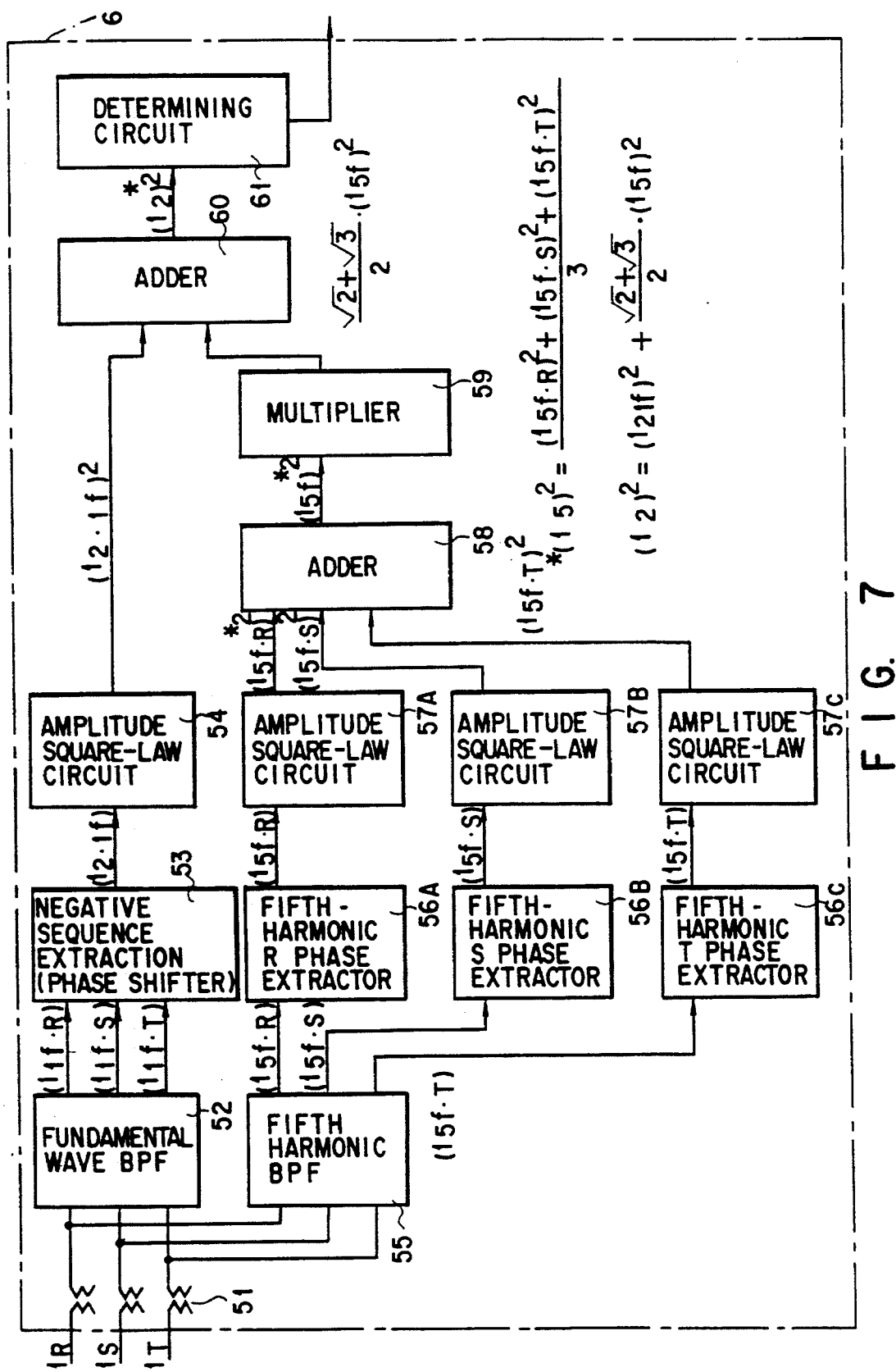
FIG. 7 is a block diagram showing the structure of the first embodiment as an analog time-overcurrent relay.

The following discusses the case where the negative-sequence time-overcurrent relay embodying this invention is accomplished by an analog time-overcurrent relay. FIG. 7 is a block diagram showing a negative-sequence time-overcurrent relay according to a seventh embodiment of this invention. The negative-sequence time-overcurrent relay of the seventh embodiment is functionally equivalent to the first embodiment shown in FIG. 1, and is realized by an analog time-overcurrent relay. The same reference numerals as used in FIG. 3 are also used in FIG. 7 for corresponding or identical elements to avoid repeating their descriptions, and only the difference between the third and seventh embodiments will be discussed below.

In the negative-sequence time-overcurrent relay 6 in FIG. 7, a synchronous armature current $I_G$ is input to an input converter 51 to be converted into an electric amount suitable for the operation of the time-overcurrent relay. Then, this electric amount is input to a fundamental wave BPF 52 and a fifth-harmonic BPF 55.

The fundamental wave BPF 52 extracts only a fundamental-wave current component, a fundamental-wave negative sequence extractor 53 extracts only a fundamental-wave negative sequence current, and a fundamental-wave negative-sequence current amplitude square-law circuit 54 obtains the square of the fundamental-wave negative-sequence current component.

The fifth-harmonic wave BPF 55 extracts only a fifth-harmonic current component for each phase, fifth-harmonic extractors 56A, 56B and 56C for the individual phases extract only the associated fifth-harmonic current components, and fifth-harmonic amplitude square-law circuits 57A, 57B and 57C obtain the squares of the fifth-harmonic current components for the individual phases. An average of the squares of the phase-by-phase fifth-harmonic current components obtained by the fifth-harmonic amplitude square-law circuits 57A, 57B and 57C is obtained by a fifth-harmonic averaging section 58, the average value is multiplied by a coefficient by a fifth-harmonic compromise equivalent negative sequence calculator 59, and the resultant value is added to the square of the fundamental-wave negative sequence current component by a compromise total negative-sequence current calculator 60.

The output of this calculator 60 or the total negative sequence current is given in a square form. The output of the calculator 60 is compared with a set value by a determining circuit 61. When the output of the calculator 60 is equal to or greater than the set value, an alarm and a trip signal are generated.

A negative-sequence time-overcurrent relay according to an eighth embodiment of the present invention will now be described with reference to FIG. 8. The same reference numerals as used in FIG. 7 are also used in FIG. 8 for corresponding or identical elements to avoid repeating their descriptions, and only the difference between the seventh and eighth embodiments will be discussed below.

Figure 8:
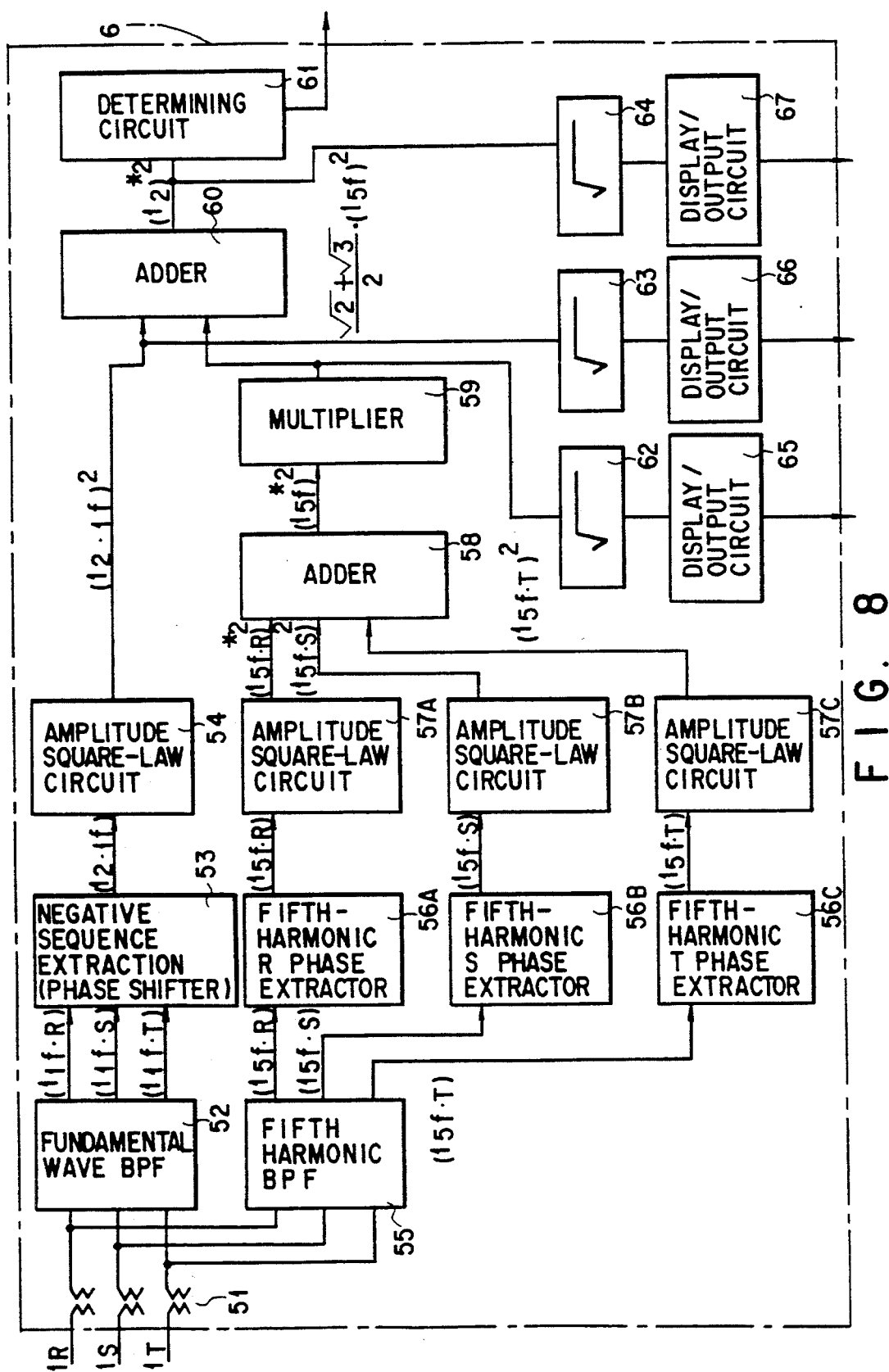
FIG. 8 is a block diagram showing the structure in FIG. 7 added with a display/output section.

The eighth embodiment shown in FIG. 8 is the structure in FIG. 7 that is added with a fundamental-wave negative sequence calculator 63, a fifth-harmonic equivalent negative sequence calculator 62 and a total negative sequence calculator 64, which perform operations on the outputs of the fundamental-wave negative-sequence current amplitude square-law circuit 54, the fifth-harmonic compromise equivalent negative sequence calculator 59 and the compromise total negative-sequence current calculator 60, and display/output circuits 66, 65 and 67 which display and output the results of those operations.

Figure 9:
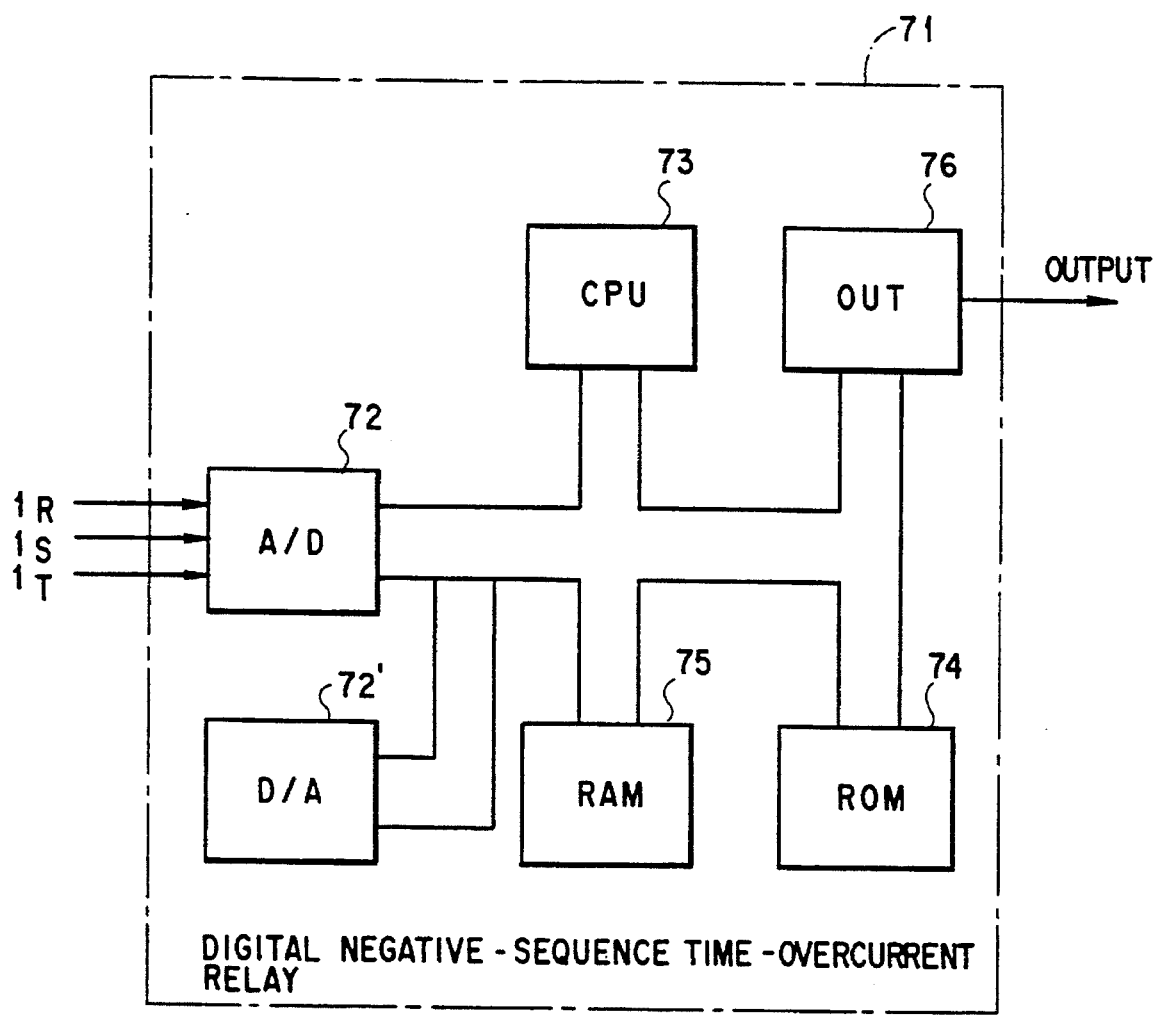
FIG. 9 is a block diagram showing the structure of the first embodiment as a digital time-overcurrent relay.

The following discusses the case where the negative-sequence time-overcurrent relay embodying this invention is accomplished by a digital analog time-overcurrent relay. FIG. 9 is a block diagram showing a negative-sequence time-overcurrent relay according to a ninth embodiment of this invention. The negative-sequence time-overcurrent relay of the ninth embodiment is functionally equivalent to the first embodiment shown in FIG. 1, and is realized by a digital analog time-overcurrent relay. The same reference numerals as used in FIG. 1 are also used in FIG. 9 for corresponding or identical elements to avoid repeating their descriptions, and only the difference between the first and ninth embodiments will be discussed below.

In FIG. 9, $I_R$, $I_S$ and $I_T$ are currents obtained by converting the armature current $I_G$ of a synchronous rotary electric machine by an instrumental transformer CT, and a digital negative-sequence time-overcurrent relay 71 itself is constituted by a known digital relay.

The currents $I_R$, $I_S$ and $I_T$ for the individual phases input to this digital relay are sampled at a given period by an analog/digital (A/D) converter 72 to be converted to digital amounts. A central processing unit (CPU) 73 performs an operation using the digital amounts and a data memory (RAM) 75 in accordance with programs previously stored in a program memory (ROM) 74, determines from the currents $I_R$, $I_S$ and $I_T$ if the compromise total negative sequence current ($I_2'$) becomes equal to or greater than a set value, and outputs the decision result from an output section 76.

The compromise total negative sequence current, etc. are displayed and output to an external unit via a digital/analog (D/A) converter 72'.

Figure 10:
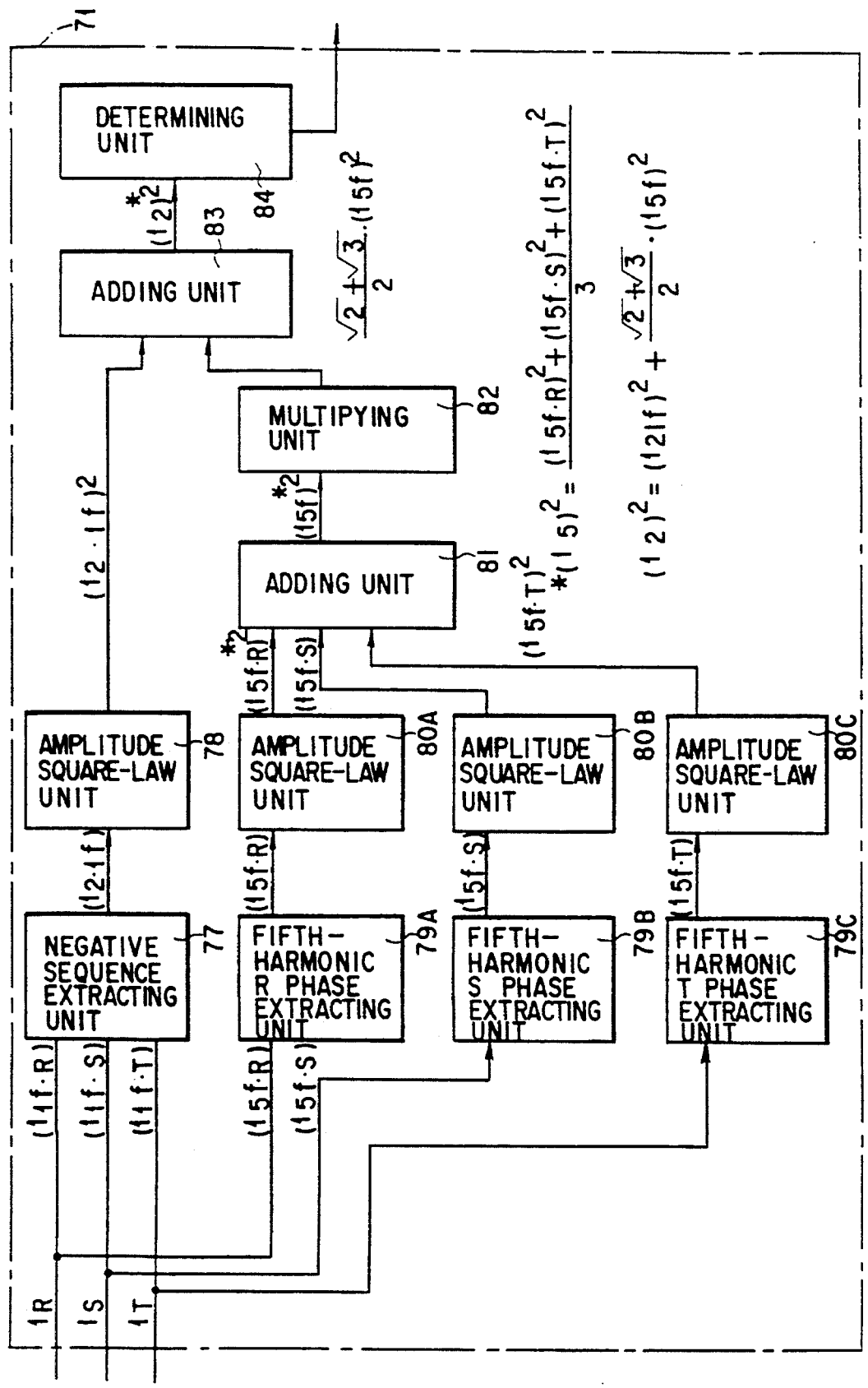
FIG. 10 is a block structural diagram schematically showing a software part of the digital time-overcurrent relay shown in FIG. 9.

FIG. 10 shows the block functions of the software portion of the digital time-overcurrent relay 71. In the digital time-overcurrent relay 71, the fundamental-wave negative sequence current components of the armature currents $I_R$, $I_S$ and $I_T$ of the synchronous rotary electric machine, which have been converted to digital values, are extracted through a program-based operation by a fundamental-wave negative sequence extracting unit 77, and a program-based operation is also performed in a fundamental-wave negative sequence amplitude square-law unit 78 to obtain the squares of the fundamental-wave negative sequence current components.

Fifth-harmonic R, S and T phase extracting units 79A, 79B and 79C extract the fifth-harmonic current components for the individual phases through a program-based operation, the squares of the phase-by-phase fifth-harmonic current components are obtained through a program-based operation in fifth-harmonic R, S and T phase amplitude square-law-units 80A, 80B and 80C, an average of those square values is obtained by a fifth-harmonic adding unit 81, and a fifth-harmonic compromise equivalent negative sequence current is obtained through a program-based operation by a fifth-harmonic compromise equivalent negative sequence calculator (multiplying unit) 82.

The fundamental-wave negative sequence currents and the fifth-harmonic compromise equivalent negative sequence currents are added through a program-based operation in a compromise total negative-sequence current calculator (an adding unit) 83, yielding a compromise total negative sequence current ($I_2'$). In this case, the compromise total negative sequence current $I_2'$ is obtained in a square form.

Then, a determining unit 84 compares the compromise total negative sequence current $I_2'$ with a set value for an alarm, a trip or the like, and an output request is made through a program-based operation if the current $I_2'$ is equal to or greater than the set value.

Figure 11:
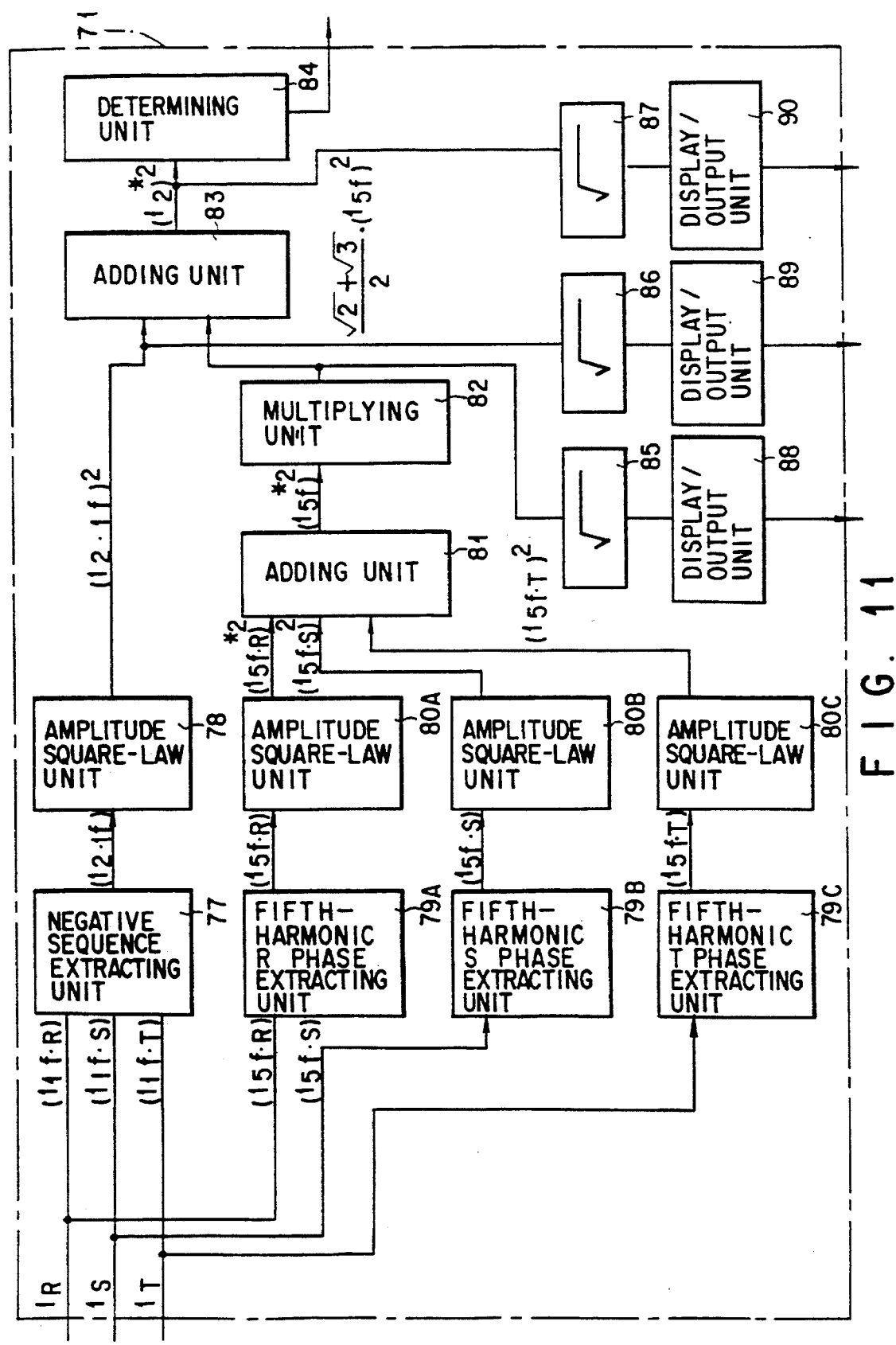
FIG. 11 is a block diagram showing the structure in FIG. 10 added with a display/output section.

FIG. 11 shows a structure that is the structure in FIG. 10 which is added with a fifth-harmonic equivalent negative sequence calculator calculating unit 85, a fundamental-wave negative sequence calculator calculating unit 86, a total negative sequence calculating unit 87, and display/output units 88, 89 and 90 for displaying the operational results from those calculating units 85 to 87. In FIG. 11, the fundamental-wave current value, the fifth-harmonic compromise negative sequence current value and the compromise total negative sequence current value are computed through program-based operations, and are displayed and output via D/A converters. Although the current is used as one electric parameter in the above-described embodiments, a voltage or other parameters may be used as well.

As described above, the present invention can provide a negative-sequence time-overcurrent relay which protects a synchronous rotary electric machine without separating a harmonic current negative sequence into a positive sequence and a negative sequence, requiring special phase and level controls and many control elements, and reducing the difference between the harmonic current and a total negative sequence current obtained from the definition equation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A negative-sequence time-overcurrent relay for use in a polyphase synchronous rotary electric machine having a main-circuit breaker and an exciting circuit, said relay comprising:

first extracting means for extracting a fundamental-wave component and a harmonic component from a predetermined electric parameter for each phase given to said polyphase synchronous rotary electric machine;

second extracting means for extracting a fundamental-wave negative sequence current for each phase from a fundamental wave for each phase extracted from said first extracting means;

first calculating means for squaring said fundamental-wave negative sequence current for each phase, extracted by said second extracting means, for each phase;

second calculating means for squaring said harmonic component for each phase, extracted by said first extracting means, for each phase;

first adding means for adding phase-by-phase operational outputs from said second calculating means;

multiplying means for multiplying an output from said first adding means by a predetermined constant;

second adding means for adding a phase-by-phase output from said first calculating means to an output from said multiplying means; and determining means for determining that said polyphase synchronous rotary electric machine should be protected when a sum of added values for individual phases obtained from said second adding means exceeds a predetermined value.

2. The negative-sequence time-overcurrent relay according to claim 1, wherein said determining means includes means for outputting a predetermined control signal to at least one of said main circuit breaker and said exciting circuit to activate at least one of said main circuit breaker and said exciting circuit, when said determining means determines that an added value obtained by said second adding means exceeds a predetermined value.

3. The negative-sequence time-overcurrent relay according to claim 1, wherein said determining means includes means for outputting an alarm signal when said determining means determines that an added value obtained by said second adding means exceeds a predetermined value.

4. The negative-sequence time-overcurrent relay according to claim 1, wherein said polyphase synchronous rotary electric machine is a polyphase synchronous motor.

5. The negative-sequence time-overcurrent relay according to claim 1, wherein said electric parameter is a current.

6. The negative-sequence time-overcurrent relay according to claim 1, wherein said harmonic component is a fifth harmonic component.

7. The negative-sequence time-overcurrent relay according to claim 1, wherein said harmonic component includes a fifth harmonic component and a seventh harmonic component.

8. The negative-sequence time-overcurrent relay according to claim 1, wherein said harmonic component 10 includes a fifth harmonic component, a seventh harmonic component, and an n-th harmonic component (n: an integer greater than 7).

9. The negative-sequence time-overcurrent relay according to claim 1, wherein said multiplying means includes means for multiplying a phase-by-phase output of said first adding means by a predetermined number for each phase.

10. The negative-sequence time-overcurrent relay according to claim 1, wherein said first extracting means includes:

a current transformer connected to said polyphase synchronous rotary electric machine;

an input circuit for adjusting a secondary output of said current transformer to a predetermined signal form;

a fundamental wave bandpass filter for passing only a fundamental wave of an output of said input circuit; and a harmonic bandpass filter for passing only a harmonic of said output of said input circuit.

11. The negative-sequence time-overcurrent relay according to claim 1, further comprising at least one means for outputting and displaying at least one of a phase-by-phase output from said second calculating means, a phase-by-phase output from said multiplying means and an added value from said second adding means.

12. The negative-sequence time-overcurrent relay according to claim 1, wherein said first extracting means, said second extracting means, said first calculating means, said second calculating means, said first adding means, said multiplying means, said second adding means and said determining means are substantially constituted by analog circuits.

13. The negative-sequence time-overcurrent relay according to claim 1, wherein said first extracting means, said second extracting means, said first calculating means, said second calculating means, said first adding means, said multiplying means, said second adding means and said determining means are substantially constituted by digital circuits.

* * * * *